(12) United States Patent
Kim et al.

(10) Patent No.: US 10,971,783 B2
(45) Date of Patent: Apr. 6, 2021

(54) ELECTRODE ASSEMBLY HAVING IMPROVED HEAT STABILITY

(71) Applicant: LG CHEM, LTD., Seoul (KR)

(72) Inventors: Dae-Soo Kim, Daejeon (KR); Min-Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 207 days.

(21) Appl. No.: 16/094,071

(22) PCT Filed: Sep. 29, 2017

(86) PCT No.: PCT/KR2017/011093
§ 371 (c)(1),
(2) Date: Oct. 16, 2018

(87) PCT Pub. No.: WO2018/066968
PCT Pub. Date: Apr. 12, 2018

(65) Prior Publication Data
US 2020/0168874 A1 May 28, 2020

(30) Foreign Application Priority Data
Oct. 4, 2016 (KR) ........................ 10-2016-0127602

(51) Int. Cl.
*H01M 2/16* (2006.01)
*H01M 2/26* (2006.01)
(Continued)

(52) U.S. Cl.
CPC ......... *H01M 50/46* (2021.01); *H01M 50/446* (2021.01); *H01M 50/449* (2021.01); *H01M 50/531* (2021.01)

(58) Field of Classification Search
CPC ..................................................... H01M 2/18
See application file for complete search history.

(56) References Cited

U.S. PATENT DOCUMENTS 5,998,059 A 12/1999 Jeon
8,455,140 B1 * 6/2013 Huang .................... H01M 2/18
429/246

(Continued)

FOREIGN PATENT DOCUMENTS

JP 2007-172880 A 7/2007
KR 10-1998-060825 A 10/1998
(Continued)

OTHER PUBLICATIONS

International Search Report for PCT/KR2017/011093 dated Feb. 2, 2018.

*Primary Examiner* — Stephan J Essex
(74) *Attorney, Agent, or Firm* — Birch, Stewart, Kolasch & Birch, LLP (57) ABSTRACT

The present disclosure is directed to providing an electrode assembly which improves the thermal safety of a battery by preventing shrinking of a separator adjacent to electrode tabs. The electrode assembly includes a positive electrode plate having a positive electrode tab at one end thereof, a negative electrode plate having a negative electrode tab at one end thereof, and a separator interposed between the positive electrode plate and the negative electrode plate, wherein the positive electrode plate and the negative electrode plate are stacked so that each of the tabs may be positioned in the same direction, and the separator has a gradient in thickness so that the thickness of one side having the electrode tabs are larger than that of the other side.

5 Claims, 4 Drawing Sheets

(51) Int. Cl.
*H01M 50/46* (2021.01)
*H01M 50/446* (2021.01)
*H01M 50/449* (2021.01)
*H01M 50/531* (2021.01)

(56) References Cited

U.S. PATENT DOCUMENTS

2011/0293990 A1* 12/2011 Ryu .................... H01M 4/386
429/145
2013/0084483 A1 4/2013 Lee et al.

FOREIGN PATENT DOCUMENTS

| KR | 10-2012-0114142 A | 10/2012 |
| KR | 10-2013-0057943 A | 6/2013 |
| KR | 10-2013-0104187 A | 9/2013 |
| KR | 10-2015-0049519 A | 5/2015 |
| KR | 10-2016-0050734 A | 5/2016 |
| KR | 10-2016-0054219 A | 5/2016 |

* cited by examiner

ELECTRODE ASSEMBLY HAVING IMPROVED HEAT STABILITY

TECHNICAL FIELD

The present application claims priority to Korean Patent Application No. 10-2016-0127602 filed on Oct. 4, 2016 in the Republic of Korea, the disclosures of which are incorporated herein by reference. The present disclosure relates to an electrode assembly having improved heat stability.

BACKGROUND ART

Recently, energy storage technology has been given increasing attentions. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused.

Typically, in terms of battery shapes, prismatic secondary batteries and pouch-type secondary batteries that can be applied to commercial products, such as cellular phones, with a small thickness have been increasingly in demand. In terms of materials, lithium secondary batteries, such as lithium ion batteries and lithium ion polymer batteries, having some advantages, including high energy density, discharge voltage and output stability, have been increasingly in demand.

Meanwhile, recently, many attentions have been given to a pouch-type battery including a stack-type or stack/folding-type electrode assembly received in a pouch-type battery casing made of an aluminum laminate sheet, since such a battery requires low manufacturing cost, has a low weight and allows easy deformation. Thus, use of such a pouch-type battery has been increased gradually.

In general, a pouch-type secondary battery includes an electrode assembly from which at least one electrode tab protrudes, an electrode lead connected to each electrode tab, and a battery casing configured to receive and seal the electrode assembly so that the electrode lead may be exposed partially toward the outside.

The battery casing includes a lower casing having a concave receiving portion in which the electrode assembly can be received, and an upper casing functioning as a cover for the lower casing and configured to seal the electrode assembly. The upper casing and the lower casing are welded with each other with the electrode assembly received therein, thereby forming a sealing portion along the outer circumferential surface of the battery casing.

In addition, a plurality of positive electrode (i.e. cathode) tabs extended from and protruding from the positive electrode current collector of the electrode assembly is connected to the positive electrode lead, for example, in the form of a welding portion formed by integral binding thereof through welding. Such a positive electrode lead is sealed with the battery casing, while the opposite end to which the positive electrode tab welding portion is connected is exposed. A plurality of positive electrode tabs is bound integrally with each other to form the welding portion.

In the case of such an electrode assembly, current density is the highest around the electrode tab while repeating charge/discharge, and thus temperature may be increased significantly. As a result, there has been a problem in that a separator is shrunk around the electrode tab to cause a short-circuit between electrodes.

Therefore, there is an imminent need for a technology capable of solving the above-mentioned problem fundamentally.

DISCLOSURE

Technical Problem

The present disclosure is designed to solve the problems of the related art, and therefore the present disclosure is directed to providing an electrode assembly having improved heat stability. Other objects and advantages of the present disclosure may be understood from the following detailed description. Meanwhile, it will be easily understood that the objects and advantages of the present disclosure may be realized by the means shown in the appended claims and combinations thereof.

Technical Solution

According to a first embodiment of the present disclosure, there is provided an electrode assembly including a positive electrode plate having a positive electrode tab at one end thereof, a negative electrode (i.e. anode) plate having a negative electrode tab at one end thereof, and a separator interposed between the positive electrode plate and the negative electrode plate, wherein the positive electrode plate and the negative electrode plate are stacked so that each of the tabs may be positioned in the same direction, and the separator has a gradient in thickness so that the thickness of one side having the electrode tabs are larger than that of the other side.

According to a second embodiment, there is provided the electrode assembly of the first embodiment, wherein the thickness of the side of the separator having the electrode tabs is 1.1-2 times larger than that of the other side. According to a third embodiment, there is provided the electrode assembly of the first or the second embodiment, wherein the separator includes a porous coating layer formed on at least one surface thereof, and the porous coating layer includes a plurality of inorganic particles and a binder polymer for binding and fixing the inorganic particles with each other. According to a fourth embodiment, there is provided the electrode assembly of the first to the third embodiments, wherein the porous coating layer has a gradient in thickness so that the separator having the porous coating layer may have the same thickness. According to a fifth embodiment, there is provided the electrode assembly of the first to the fourth embodiments, wherein the separator having the porous coating layer has a thickness of 10-80 μm.

According to a sixth embodiment, there is provided the electrode assembly of the first to the fifth embodiments, wherein the vertical section of the separator has an isosceles trapezoidal shape.

According to a seventh embodiment, there is provided the electrode assembly of the first to the sixth embodiments, wherein the vertical section of the separator has a trapezoidal shape in which two internal angles are 90°.

Advantageous Effects

According to the present disclosure, it is possible to prevent shrinking of a separator caused by heat emission from electrode tabs and to prevent a short-circuit between electrodes, thereby improving heat stability of a battery.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

FIG. 2a to FIG. 3b are sectional views illustrating the electrode assembly according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is linked to another portion' includes not only 'one portion is linked directly to another portion' but also 'one portion is linked electrically to another portion with the other portion interposed between them'.

It will be understood that the terms "comprises" and/or "comprising", or "includes" and/or "including" when used in this specification, refer to the presence of any stated element, but do not preclude the addition of one or more other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect, there is provided a separator for a secondary battery and an electrode assembly including the separator. Herein, one end of the separator is formed to have a larger thickness as compared to the other end opposite thereto. According to the present disclosure, the electrode assembly includes a positive electrode plate and a negative electrode plate stacked successively with the separator interposed therebetween, wherein the tabs of the negative electrode plate and the positive electrode plate are positioned in the same direction, and the thickness of one side of the separator having the electrode tabs are larger than the thickness of the other side.

Figure 1:
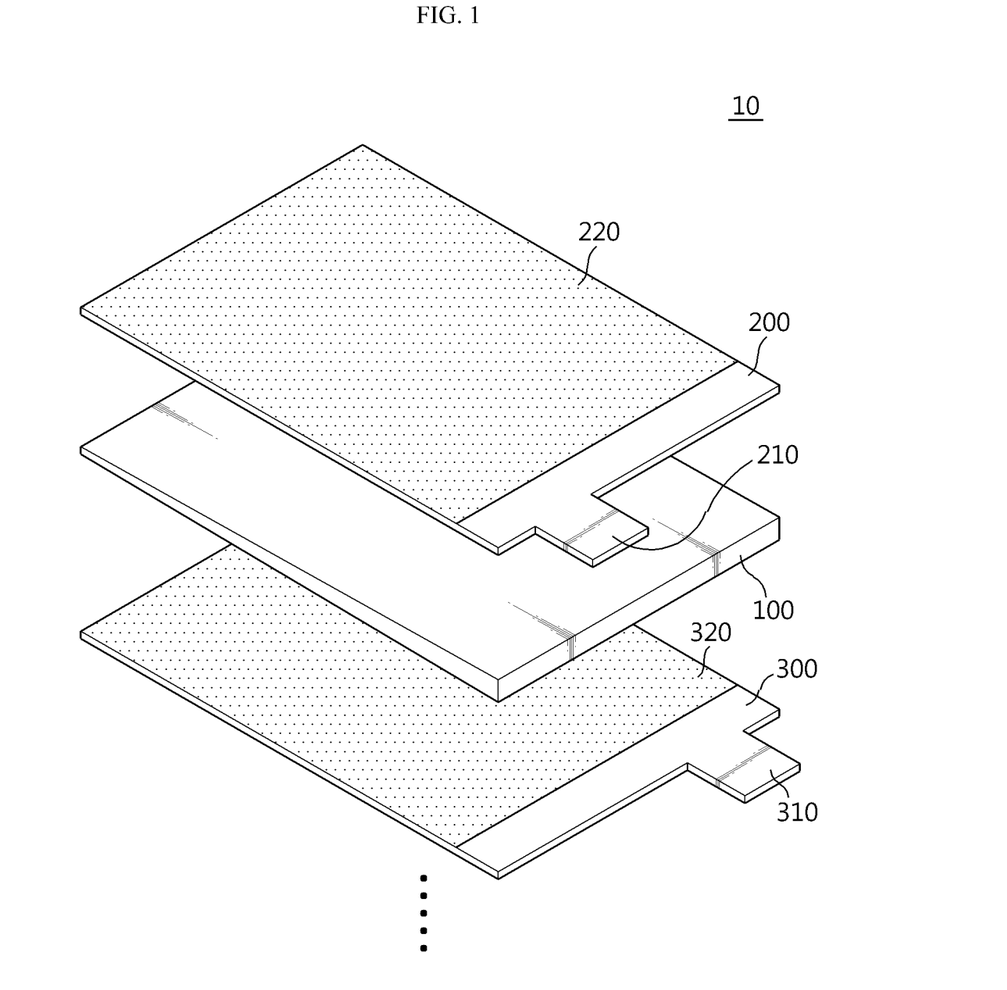
FIG. 1 is an exploded perspective view illustrating the electrode assembly according to an embodiment of the present disclosure.

FIG. 1 is an exploded perspective view illustrating the electrode assembly according to an embodiment of the present disclosure. Referring to FIG. 1, the electrode assembly 10, like the conventional electrode assembly, includes a positive electrode plate 200 having a positive electrode tab 210 at one end thereof, a negative electrode plate 300 having a negative electrode tab 310 at one end thereof, and a separator 100 interposed between the positive electrode plate 200 and the negative electrode plate 300.

According to the conventional electrode assembly, there is a problem in that a separator may be shrunk by heat emission around an electrode tab, thereby causing a short-circuit between electrodes. According to the present disclosure, it is possible to prevent shrinking of a separator caused by heat emission by forming the separator to have a larger thickness around the electrode tabs.

Figure 2A:
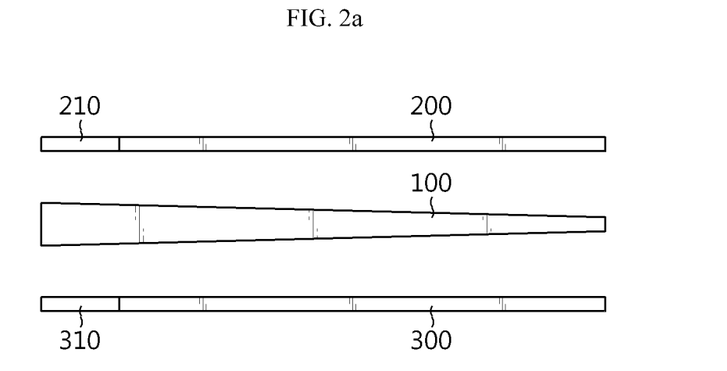
Figure 2B:
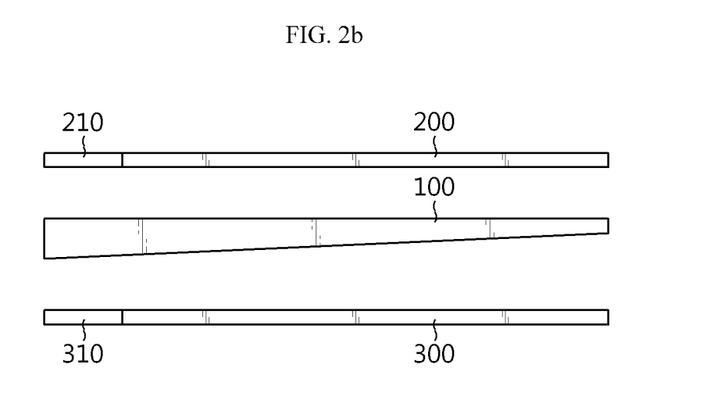

FIG. 2a and FIG. 2b are sectional views illustrating the electrode assembly according to an embodiment of the present disclosure. Referring to FIG. 2a and FIG. 2b, the electrode assembly according to an embodiment of the present disclosure includes a positive electrode plate 200 and a negative electrode plate 300 stacked successively so that each of the tabs 210, 310 may be positioned in the same direction. In addition, the thickness of the side having the electrode tabs is larger than that of the other side. According to an embodiment of the present disclosure, the thickness of the separator has a gradient in thickness in such a manner that it increases linearly or step-wisely from one end to the other end. Since the separator is formed to have a larger thickness at the portion having the electrode tabs and generating a significant increase in temperature caused by heat concentration, it is possible to prevent shrinking of the separator and to improve the thermal safety.

The thickness of one side of the separator having the electrode tabs may be 1.1-2.0 times larger than the thickness of the other side. According to an embodiment of the present disclosure, the separator may have a thickness of 5 μm-30 μm at its thinner side.

According to an embodiment of the present disclosure, the separator may include a polymer substrate, such as a polymer film. In addition, it is preferred that such a polymer substrate has a porous structure including a plurality of pores. Although there is no particular limitation in pore size and porosity present in the polymer substrate, the pore size and porosity may be approximately 0.01 μm-50 μm and approximately 10-95%, respectively. The polymer substrate includes a polymer material. There is no particular limitation in the polymer material, as long as it is used as a material for a separator in the art. The polymer material may include but is not limited to: polyethylene, polypropylene, polyethylene terephthalate, polybutylene terephthalate, polyester, polyacetal, polyamide, polycarbonate, polyamide, polycarbonate, polyimide, polyetherether ketone, polyarylether ketone, polyether imide, polyamideimide, polybenzimidazole, polyether sulfone, polyphenylene oxide, cyclic olefin copolymer, polyphenylene sulfide or polyethylene naphthalene, or a combination of two or more of them.

In addition, according to the present disclosure, a porous coating layer including inorganic particles may be formed on either surface or both surfaces of the above-described separator. Herein, such a separator having a porous coating layer is called a composite separator in order to differentiate it from the above-described separator.

According to the present disclosure, the composite separator having the porous coating layer may be provided for the purpose of improving the heat resistance and stability of the polymer substrate used for the separator and impregnation of the separator with an electrolyte.

According to the present disclosure, the porous coating layer may have an even thickness overall the porous coating layer. In other words, the composite separator having a porous coating layer may have the same gradient in thickness as the polymer substrate used as a separator.

Meanwhile, according to an embodiment of the present disclosure, the polymer substrate may be coated with the porous coating layer in such a manner that both sides of the finished composite separator may have the uniform thickness. In other words, it is possible to supplement a level difference in the separator by forming the porous coating layer. For example, a thinner porous coating layer is formed in the thicker portion of the polymer substrate, while a thicker porous coating layer is formed in the thinner portion of the polymer substrate.

Figure 3A:
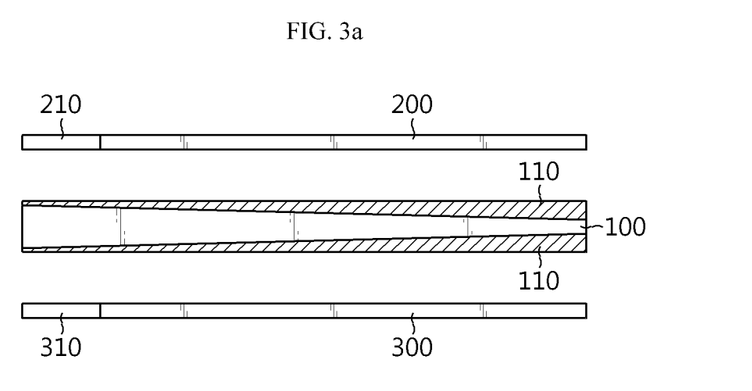
Figure 3B:
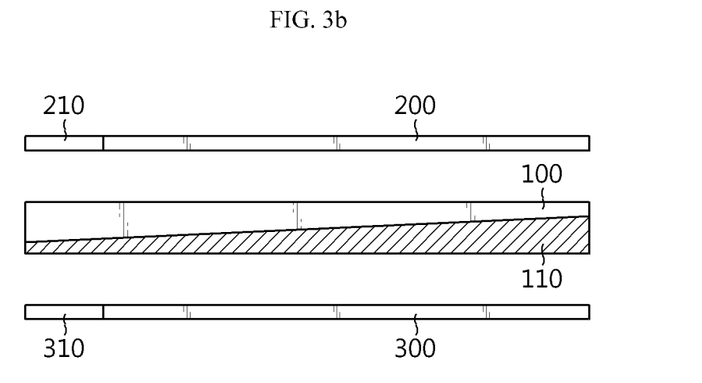

Hereinafter, the electrode assembly will be explained in detail with reference to the accompanying drawings. FIG. 3a and FIG. 3b are sectional views illustrating the electrode assembly according to an embodiment of the present disclosure. Referring to FIG. 3a and FIG. 3b, the electrode assembly according to an embodiment of the present disclosure may have a porous coating layer 110 on at least one surface of the separator 100, and the porous coating layer may include a plurality of inorganic particles and a binder polymer which connects and fixes the inorganic particles with each other. By virtue of the porous coating layer, it is possible to improve the thermal safety of the separator.

In addition, the porous coating layer may have a gradient in thickness so that the thickness of the separator having the porous coating layer may have the same thickness. Since the porous coating layer has a gradient in thickness, it is possible to supplement a level difference caused by the gradient thickness of the separator.

Meanwhile, according to an embodiment of the present disclosure, the separator having a porous coating layer may have a thickness of 10 µm-80 µm.

Referring to FIG. 2a and FIG. 2b, the vertical section of the separator 100 may have an isosceles trapezoidal shape, or a trapezoidal shape in which two internal angles are 90°. There is no particular limitation in the shape of the vertical section, as long as the separator has a gradient in thickness.

According to an embodiment of the present disclosure, the porous coating layer includes a mixture of inorganic particles with a binder polymer.

According to the present disclosure, the inorganic particles used for forming the porous coating layer are not particularly limited, as long as they are electrochemically stable. In other words, the inorganic particles that may be used in the present disclosure are not particularly limited, as long as they do not cause oxidation and/or reduction in a range of driving voltage (e.g. 0-5V based on $Li/Li^+$) of the corresponding electrochemical device. Particularly, when using inorganic particles capable of transporting ions, it is possible to increase the ion conductivity in an electrochemical device, thereby improving the performance of the electrochemical device.

In addition, when using inorganic particles capable of transporting ions, it is possible to improve the ion conductivity of an electrolyte by increasing the dissociation degree of an electrolyte salt, such as a lithium salt, in a liquid electrolyte.

For the above-described reasons, it is preferred that the inorganic particles include inorganic particles having a dielectric constant of 5 or more, preferably a high dielectric constant of 10 or more, inorganic particles capable of transporting lithium ions, or a combination thereof. Non-limiting examples of the inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT, wherein $0<x<1$ and $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$, or the like, alone or in combination.

Particularly, inorganic particles, such as $BaTiO_3$, $Pb(Zr,Ti)O_3$ (PZT), $Pb_{1-x}La_xZr_{1-y}Ti_yO_3$ (PLZT, wherein $0<x<1$ and $0<y<1$), $Pb(Mg_{1/3}Nb_{2/3})O_3$—$PbTiO_3$ (PMN-PT) and hafnia ($HfO_2$) have a high dielectric constant of 100 or more and also show piezoelectricity with which a potential difference is generated between both surfaces due to the generation of charges upon the drawing or compression under the application of predetermined pressure. Thus, they can contribute to improvement of the safety of an electrochemical device by preventing a short-circuit between both electrodes caused by external impact. In addition, a combination of such inorganic particles having a high dielectric constant with the inorganic particles capable of transporting lithium ions can provide a synergic effect.

According to the present disclosure, the inorganic particles capable of transporting lithium ions refer to those containing lithium elements and having a function of transporting lithium ions without storing lithium. Since the inorganic particles capable of transporting lithium ions can transport and transfer lithium ions through a kind of defect present inside of the particle structure, it is possible to provide improved lithium ion conductivity in a battery and thus to improve the battery performance. Non-limiting examples of the inorganic particles capable of transporting lithium ions include: at least one selected from $(LiAlTiP)_xO_y$-based glass ($0<x<4$, $0<y<13$), such as lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), and $14Li_2O-9Al_2O_3-38TiO_2-39P_2O_5$; lithium lanthanum titanate ($Li_xLa_yTiO_3$, $0<x<2$, $0<y<3$); lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$; lithium nitride ($Li_xN_y$, $0<x<4$, $0<y<2$), such as $Li_3N$; $SiS_2$-based glass ($Li_xSi_yS_z$, $0<x<3$, $0<y<2$, $0<z<4$), such as $Li_3PO_4$—$Li_2S$—$SiS_2$; $P_2S_5$-based glass ($Li_xP_yS_z$, $0<x<3$, $0<y<3$, $0<z<7$), such as LiI—$Li_2S$—$P_2S_5$; or a combination thereof.

Referring to FIG. 1, the positive electrode plate 200 includes a positive electrode current collector and a positive electrode active material layer 220 formed on at least one surface of the positive electrode current collector, and the negative electrode plate 300 includes a negative electrode current collector and a negative electrode active material layer 320 formed on at least one surface of the negative electrode current collector. The electrode plate is provided with a non-coated portion at an outer border portion of each electrode plate, wherein electrode active materials are not coated thereon. The electrode plate is provided with an electrode tab in the non-coated portion of the electrode. The electrode tab may be formed through resistance welding, ultrasonic welding or laser welding of a metallic material having high conductivity, or formed by forming an electrode active material on the electrode current collector in the form of a stripe and carrying out stamping or notching so that the electrode tab may be formed in the non-coated portion of the electrode.

In another aspect, there is provided an electrode assembly including the separator and/or composite separator. The electrode assembly includes at least one positive electrode plate and at least one negative electrode plate stacked successively with the separator and/or the composite separator interposed between them. An electrode tab protrudes from each of the positive electrode plate and the negative electrode plate. In addition, the positive electrode tab and the negative electrode tab are arranged so that they may protrude in the same direction. The separator has a larger thickness at one side from which each electrode tab protrudes as compared to the thickness of the other side.

According to the present disclosure, the negative electrode plate includes a negative electrode current collector and a negative electrode layer formed on at least one surface of the negative electrode current collector. The negative electrode layer includes a negative electrode active material, a conductive material and a binder polymer. According to an embodiment of the present disclosure, the negative electrode active material may include but is not limited to: carbonaceous materials, such as natural graphite, artificial graphite, expanded graphite, carbon fibers, non-graphitizable carbon, carbon black, carbon nanotubes, fullerene and activated carbon; metals, such as Al, Si, Sn, Ag, Bi, Mg, Zn, In, Ge, Pb, Pd, Pt and Ti, capable of alloying with lithium, and compounds containing the above elements; metals and metallic compounds, and composite compounds of carbon and graphite materials; lithium-containing nitrides; or the like. Among them, carbonaceous materials are preferred.

The positive electrode plate includes a positive electrode current collector and a positive electrode layer formed on at least one surface of the positive electrode current collector. The positive electrode layer includes a positive electrode active material, a conductive material and a binder polymer. Particular examples of the positive electrode active material may include, but are not limited to: a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+x}Mn_{2-x}O_4$ (wherein x is 0-0.33), $LiMnO_3$, $LiMn_2O_3$ or $LiMnO_2$; a lithium copper oxide ($Li_2CuO_2$); a vanadium oxide such as $LiV_3O_8$, $LiFe_3O_4$, $V_2O_5$ or $Cu_2V_2O_7$; a Ni-site type lithium nickel oxide represented by the chemical formula of $LiNi_{1-x}M_xO_2$ (wherein M is Co, Mn, Al, Cu, Fe, Mg, B or Ga, and x is 0.01-0.3); a lithium manganese composite oxide represented by the chemical formula of $LiMn_{2-x}M_xO_2$ (wherein M=Co, Ni, Fe, Cr, Zn or Ta, and x is 0.01-0.1) or $Li_2Mn_3MO_8$ (wherein M=Fe, Co, Ni, Cu or Zn); $LiMn_2O_4$ in which Li is partially substituted with an alkaline earth metal ion; a disulfide compound; $Fe_2(MoO_4)_3$ or the like.

According to the present disclosure, the current collector is not particularly limited, as long as it is a metal which has high conductivity, allows easy adhesion of an electrode mixture and shows no reactivity in the voltage rage of the corresponding electrochemical device. Although there is no particular limitation in the current collector, stainless steel, aluminum, nickel, titanium, baked carbon, or aluminum or stainless steel surface-treated with carbon, nickel, titanium or silver may be used. In general, the current collector may be formed to have a thickness of 3-500 μm.

According to the present disclosure, the binder polymer is an ingredient which assists binding of an active material with a conductive material and binding to a current collector, and is added in an amount of 1-50 wt % based on the total weight of the electrode layer. The binder polymer may include a high-molecular weight polyacrylonitrile-co-acrylic acid but is not limited thereto. Other examples of the binder polymer may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like.

In addition, the secondary battery according to the present disclosure may be obtained by receiving/sealing an electrode assembly including the positive electrode and the negative electrode stacked alternately with the separator interposed therebetween into/with a casing material, such as a battery casing, together with an electrolyte. Conventional methods for manufacturing secondary batteries may be used with no particular limitation.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example

1) Manufacture of Separator

A polyethylene porous film (permeability 300 seconds/100 cc) was prepared and a part of the film was heated and oriented to control its thickness. The film was cut into a size of 10 cm×20 cm, wherein the thickness of one side of the shorter opposite sides was 15 μm and the thickness of the other side opposite thereto was 12 μm.

2) Manufacture of Composite Separator

A polyethylene porous film (permeability 300 seconds/100 cc) was prepared and a part of the film was heated and oriented to control its thickness. The film was cut into a size of 10 cm×20 cm, wherein the thickness of one side of the shorter opposite sides was 10.1 μm and the thickness of the other side opposite thereto was 9.44 μm.

Next, polyvinylidene fluoride-co-hexafluoropropylene (containing 20 mole % of hexafluoropropylene) having a solubility of 20 wt % to acetone at 35° C., polyvinylidene-co-chlorotrifluoroethylene (containing 8 mole % of chlorotrifluoroethylene) having a solubility of 5 wt % to acetone at 35° C. and cyanoethylpullulan were added to acetone at a weight ratio of 8:2:2 and dissolved at 50° C. for about 12 hours or more to obtain a binder polymer solution. To the resultant binder polymer solution, powder containing $Al_2O_3$ and $BaTiO_2$ mixed at a weight ratio of 9:1 was added so that the weight ratio of binder polymer/inorganic particles equals to 20/80. Then, the inorganic powder was crushed and dispersed by using a ball mill process for 12 hours or more to obtain slurry. The resultant slurry was coated onto one surface of the porous film by using a doctor blade and then dried to obtain a composite separator. Herein, the coating thickness of the porous coating layer was controlled in order to overcome the level difference in the porous film and to allow the composite separator to have the same thickness of 15 μm.

3) Determination of Thickness of Separator

Figure 4A:
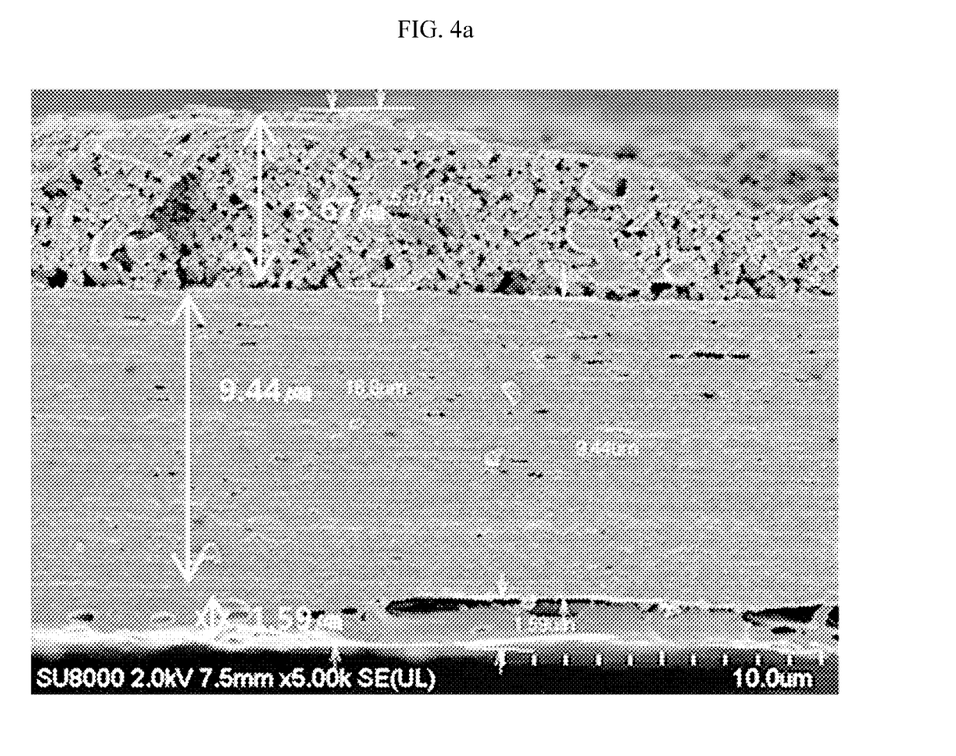
FIG. 4a and FIG. 4b are scanning electron microscopic (SEM) images illustrating the electrode assembly according to an embodiment of the present disclosure.
Figure 4B:
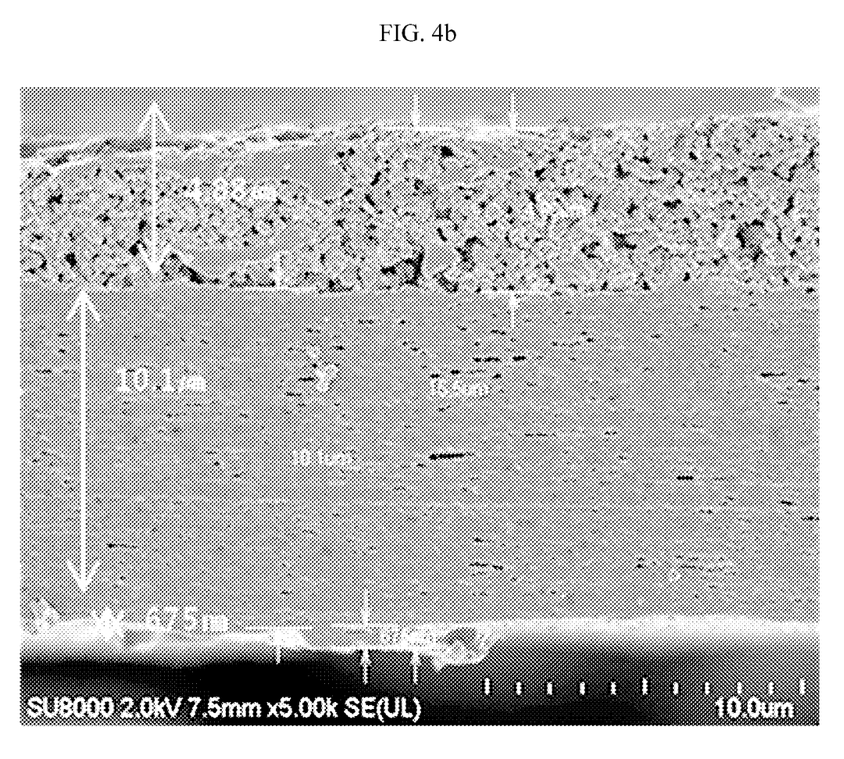

FIG. 4a and FIG. 4b are scanning electron microscopic (SEM) images illustrating the sectional surface of the composite separator obtained according to Preparation Example 2. FIG. 4a illustrates the thinner side of the shorter opposite sides of the porous substrate, and FIG. 4b illustrates the thicker side of the shorter opposite sides of the porous substrate. As can be seen from the drawings, the composite separator having a porous separator shows a reduced gradient in thickness.

4) Heat Resistance Test

At the portion spaced apart from each edge of the shorter opposite sides of the porous substrate according to Preparation Example 1 by about 1 cm, a quadrangular shape was marked with a size of 1 cm×1 cm. Then, the porous substrate was maintained in an oven under a temperature of 120° C. for about 1 hour. Next, the shrinkage of each part was determined. The quadrangular area of the opposite sides having a thickness of 12 μm showed a shrinkage of about 50%, while the quadrangular area of the opposite sides having a thickness of 15 μm showed a shrinkage of about 37%. Therefore, it can be seen that when the electrode assembly is stacked so that electrode tabs may protrude from the thicker portion of the separator, shrinking of the separator around the electrode tabs can be inhibited and thus the separator can provide improved heat resistance and stability.

DESCRIPTION OF DRAWING NUMERALS

100: Separator
110: Porous coating layer
200: Positive electrode plate
210: Positive electrode tab
220: Positive electrode active material layer
300: Negative electrode plate
310: Negative electrode tab
320: Negative electrode active material layer

What is claimed is:

1. An electrode assembly, comprising:
a positive electrode plate having a positive electrode tab at one end thereof, a negative electrode plate having a negative electrode tab at one end thereof, and a separator interposed between the positive electrode plate and the negative electrode plate,
wherein the positive electrode plate and the negative electrode plate are stacked so that each of the tabs are positioned in the same direction, and
the separator has a gradient in thickness so that the thickness of one side having the electrode tabs is larger than that of the other side,
wherein the separator comprises a porous coating layer formed on at least one surface thereof, and the porous coating layer comprises a plurality of inorganic particles and a binder polymer for binding and fixing the inorganic particles with each other,
wherein the binder polymer comprises at least one of a high-molecular weight polyacrylonitrile-coacrylic acid, polyvinylidene fluoride copolymer, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, or fluororubber, and
wherein the porous coating layer has a gradient in thickness so that the separator having the porous coating layer has a uniform thickness.

2. The electrode assembly according to claim 1, wherein the thickness of the side of the separator having the electrode tabs is 1.1-2.0 times larger than that of the other side.

3. The electrode assembly according to claim 1, wherein the separator having the porous coating layer has a thickness of 10-80 μm.

4. The electrode assembly according to claim 1, wherein a vertical section of the separator has an isosceles trapezoidal shape.

5. The electrode assembly according to claim 1, wherein a vertical section of the separator has a trapezoidal shape in which two internal angles are 90°.

* * * * *